United States Patent [19]

Porsch et al.

[11] Patent Number: 5,391,631
[45] Date of Patent: Feb. 21, 1995

[54] VINYL POLYMERS PRODUCED BY A TWO-STAGE PROCEDURE AND THEIR USE AS SURFACE COATING BINDERS

[75] Inventors: Bettina Porsch, Eisenberg; Hans Renz, Meckenheim, both of Germany

[73] Assignee: BASF Aktiengesellschaft, Ludwigshafen, Germany

[21] Appl. No.: 67,806

[22] Filed: May 27, 1993

[30] Foreign Application Priority Data

Jun. 25, 1992 [DE] Germany .............................. 4220807

[51] Int. Cl.⁶ .................... C08F 265/02; C08F 265/04
[52] U.S. Cl. ..................................... 525/303; 525/285; 525/286; 525/293; 525/296; 525/301; 525/302
[58] Field of Search ........................ 525/303, 301, 302

[56] References Cited

U.S. PATENT DOCUMENTS 4,113,803  9/1978  Price .
4,758,642  7/1988  Yezrielev et al. .
4,855,369  8/1989  Yezrielev et al. .

FOREIGN PATENT DOCUMENTS

82722/91  3/1992  Australia .
0225808   6/1987  European Pat. Off. .
0225809   6/1987  European Pat. Off. .
0095627   3/1989  European Pat. Off. .

Primary Examiner—Vasu S. Jagannathan
Attorney, Agent, or Firm—Oblon, Spivak, McClelland, Maier & Neustadt

[57] ABSTRACT

A vinyl polymer is obtainable by polymerizing vinyl monomers in at least two stages by a procedure in which, in a first stage, from 5 to 95% by weight of vinyl monomers are polymerized in an organic solvent or in the absence of a solvent and, in the second stage, from 5 to 95% by weight of the vinyl monomers are polymerized in the presence of the vinyl polymer obtained in the first stage, likewise in an organic solvent or in the absence of a solvent, with the proviso that the polymerization in the second stage is carried out under conditions under which an average molecular weight $M_n$, which is at least 1,000 higher compared with that of the vinyl polymer, the first stage of results for the vinyl monomers of the second stage in the absence of the vinyl polymer obtained in the first stage.

1 Claim, No Drawings

VINYL POLYMERS PRODUCED BY A TWO-STAGE PROCEDURE AND THEIR USE AS SURFACE COATING BINDERS

The present invention relates to vinyl polymers obtainable by polymerizing vinyl monomers in at least two stages, wherein, in the first stage, from 5 to 95% by weight of vinyl monomers are polymerized in an organic solvent or in the absence of a solvent and, in the second stage, from 5 to 95% by weight of the vinyl monomers are polymerized in the presence of a vinyl polymer obtained in the first stage, likewise in an organic solvent solvent or in the absence of a solvent, with the proviso that the polymerization in the second stage is carried out under conditions under which an average molecular weight $M_n$, which is at least 1,000 higher compared with the vinyl polymer of the first stage, results for the vinyl monomers of the second stage in the absence of the vinyl polymer obtained in the first stage.

Curable binders are very important for industrial coating, for example for the series coating of automobiles and household appliances. Examples of suitable binders are self-crosslinking or externally crosslinking acrylate polymers, which are prepared by polymerization in organic solution. To keep the amount of solvent in the coating material as low as possible, solutions having high solids contents of such acrylate polymers are desirable.

High solids contents are possible if the acrylate polymers have only a low molecular weight. High solids coating materials formulated therefrom are disclosed in, for example, EP-A-225 808 and EP-A-225 809. However, the disadvantage of these conventional high solids coatings is the poor hardness of the coatings produced therewith.

EP-A-95 627 discloses the preparation of acrylate polymers in a 2-stage procedure in order to optimize performance characteristics of the binders.

The polymers of the two stages are chosen so that, in the case of separate one-stage preparation, they would form a two-phase system when mixed. In this process, too, a desired combination of high solids content of the binder solutions and high hardness of the resulting coatings cannot be achieved. Only in Example 2 in European Patent 95,627 is the temperature in the first stage higher than that in the second stage.

It is an object of the present invention to provide vinyl polymers which, particularly because of their low viscosity, are suitable for binder solutions or coating materials having a high solids content and give coats having high hardness.

We have found that this object is achieved by the vinyl polymers defined at the outset, a process for their preparation and their use as surface coating binders.

The polymerization of the vinyl monomers in the individual stages is carried out by mass or, preferably, solution polymerization.

In the solution polymerization, the polymerization of the vinyl monomers is carried out in a solvent. Both the vinyl monomers and the resulting vinyl polymer are soluble in the solvent.

Conventionally inert solvents may be used as solvents for the solution polymerization. Organic solvents which are subsequently also used in the finished coating materials are preferred. Examples of such solvents are glycol ethers, such as ethylene glycol dimethyl ether, glycol ether esters, such as ethylglycol acetate, butylglycol acetate, 3-methoxy-n-butyl acetate, butyldiglycol acetate and methoxypropyl acetate, esters, such as butyl acetate, isobutyl acetate and amyl acetate, and ketones, such as methyl ethyl ketone, methyl isobutyl ketone, diisobutyl ketone, cyclohexanone and isophorone. Aromatic hydrocarbons, such as xylene and Solvesso ® 100 (aromatic hydrocarbon mixtures of predominantly $C_1$-$C_4$-alkylbenzenes), and aliphatic hydrocarbons are preferably used diluted with the abovementioned solvents.

The free radical polymerization can be carried out thermally and/or in the presence of a suitable initiator.

Suitable initiators are preferably soluble in the vinyl monomers or in the solvent. Examples are azo compounds or peroxides, such as tert-butyl perbenzoate, tert-butyl peroctoate, ter-butyl perpivalate or di-tert-butyl peroxide.

The molecular weight of the vinyl polymers can be adjusted in a known manner by the addition of regulators, in particular of mercaptans, the choice of the polymerization temperature or the amount of initiator (Houben-Weyl, Methoden der Org. Chemie, 4th Edition, Volume 14/1, pages 24–255, 1961). The molecular weight of the vinyl polymers is known to decrease with increasing temperature or increasing amount of regulator or initiator.

The novel vinyl polymers are obtainable by polymerization in at least two stages, preferably in two stages.

In the polymerization of the vinyl monomers of the first stage, for example, a part of the vinyl monomers and/or of the solvent may be initially taken and the remaining amount of the vinyl monomers and of the solvent may be metered in together with the necessary amount of initiator during the polymerization.

The vinyl monomers of the first stage are preferably polymerized up to at least 70%, particularly preferably at least 95%.

The polymerization of the vinyl monomers of the second stage is carried out in the presence of the vinyl polymer obtained in the first stage.

The vinyl monomers and necessary amounts of solvent and initiator are suitably metered into an initially taken mixture which contains the dissolved vinyl polymer of the first stage. In particular, the reaction solution obtained directly after the end of the polymerization in the first stage is used as the initially taken mixture.

The polymerization of the vinyl monomers in the second stage is carried out in such a way that a vinyl polymer prepared correspondingly in the absence of the first stage has an average molecular weight $M_n$ which is at least 1,000, preferably at least 3,000, particularly preferably at least 5,000, higher than that of the vinyl polymer of the first stage.

The average molecular weight $M_n$ of the first stage is preferably from 500 to 20,000, particularly preferably from 500 to 5,000.

The polymerization of the monomers of the second stage is carried out so that the average molecular weight $M_n$ where polymerization is assumed to have been effected in the absence of the vinyl polymer of the first stage is preferably from 2,000 to 100,000, particularly preferably from 3,000 to 20,000.

In the polymerization of the vinyl monomers of the second stage in the presence of the first stage, in particular graft polymers may result.

The vinyl polymer obtained after the second stage therefore generally does not exhibit a purely bimodal distribution, as would correspond exactly to the average molecular weights of the separately prepared individual stages. The molecular weight distribution of the vinyl polymer generally has a clear maximum at lower molecular weights, which substantially corresponds to the first stage. A plurality of secondary maxima may occur at higher molecular weights, resulting in a generally broad molecular weight distribution.

In contrast to polymers which either have a low molecular weight and a narrow distribution or have a high molecular weight and a broad distribution, a lower molecular weight and a substantially broader distribution is typical of the novel vinyl polymers.

The average molecular weight $M_n$ of the vinyl polymer obtained after the second stage is preferably from 2,000 to 40,000, particularly preferably from 3,000 to 15,000. The molecular weight distribution of the vinyl polymer is in particular from 3.0 to 12.0, particularly preferably from 3.0 to 7.0 ($M_w/M_n$, weight average molecular weight/number average molecular weight).

The polymerization conditions in the two stages for obtaining the molecular weight differ in particular in the polymerization temperature.

The polymerization temperature in the first stage is preferably from 130° to 250° C., particularly preferably from 170° to 210° C.

The polymerization temperature in the second stage is preferably from 80° to 200° C., particularly preferably from 120° to 160° C., the polymerization temperature in the first stage being at least 10° C., preferably at least 25° C., very particularly preferably at least 40° C., higher than that in the second stage.

The amount of the vinyl monomers which are polymerized in the first stage is from 5 to 95% by weight and that in the second stage is likewise from 5 to 95% by weight, based on the total vinyl polymer.

Preferably, from 35 to 90, particularly preferably from 65 to 80, % by weight of the vinyl monomers are polymerized in the first stage and from 10 to 65, particularly preferably from 20 to 35, % by weight of the vinyl monomers are polymerized in the second stage.

The compositions of the vinyl monomers in the individual stages may be identical or different.

The vinyl monomers may be, for example, predominantly alkyl esters of acrylic or methacrylic acid where the alkyl radical is of 1 to 20 carbon atoms, vinyl esters of carboxylic acids of 1 to 20 carbon atoms, vinylaromatics of up to 20 carbon atoms, ethylenically unsaturated nitriles of 3 to 6 carbon atoms or vinyl halides or mixtures of these monomers.

Particularly in view of the use as surface coating binders, the vinyl polymer is preferably a polyacrylate which is composed of a) from 10 to 100% by weight of $C_1$–$C_{20}$-alkyl (meth)acrylates,
b) from 0 to 50% by weight of vinyl monomers having at least one hydroxyl, epoxy, carboxyl, carboxylic anhydride, carbonyl, amino or amido group and
c) from 0 to 90% by weight of vinyl monomers differing from a) and b).

The acrylate polymer is preferably composed of from 50 to 95% by weight of a), from 5 to 40% by weight of b) and from 0 to 45% by weight of c) and particularly preferably of from 50 to 80% by weight of a), from 20 to 40% by weight of b) and from 0 to 30% by weight of c).

Monomers a) are preferably $C_1$–$C_8$-alkyl (meth)acrylates, particularly preferably $C_1$–$C_4$-alkyl (meth)acrylates.

Monomers b) must be present, for example, if the acrylate polymer is to be crosslinkable or self-crosslinkable.

Self-crosslinkable acrylate polymers contain, for example, N-methylol(meth)acrylamide, which undergoes autocondensation via the methylol groups.

Monomers which can impart crosslinkability of the acrylate polymers are in particular hydroxy-$C_1$–$C_{10}$-alkyl (meth)acrylates, glycidyl (meth)acrylate, (meth)acrylic acid, maleic acid, (meth)acrylamide, acetoacetyl (meth)acrylate, acetoacetoxyethyl (meth)acrylate, N-alkylaminoalkyl (meth)acrylates, eg. N-ethylaminoethyl (meth)acrylate, and carboxylic anhydrides, eg. maleic anhydride.

Examples of crosslinking agents for such crosslinkable acrylate polymers are amino resins, epoxy resins, polyisocyanates and polyhydrazides.

Further monomers c) are in particular vinyl aromatics of up to 20 carbon atoms, preferably styrene or α-methylstyrene.

In particular, the monomers are chosen so that the vinyl polymer obtained has a glass transition temperature of from −45° to +30° C., particularly preferably from −20° to +10° C. The glass transition temperature can be determined by conventional methods, for example from the measurement of the modulus of elasticity in the creep test, as a function of the temperature, or by means of differential thermal analysis (DTA) (cf. A. Zosel, Farbe und Lack 82 (1976), 125–134).

The novel vinyl polymers are particularly suitable for coating materials, preferably as surface coating binders. Because of their relatively low viscosity, inter alia, the solutions achieve higher solids contents in the coating material at the same processing viscosity. The coatings obtained, for example on wood, metal, plastic and paper, have a good hardness/flexibility ratio.

Furthermore, the vinyl polymers can also be used as binders in adhesives.

Particularly suitable solvents for the surface coating binders are those stated above as solvents for the preparation of the vinyl polymers. Further solvents include liquid polyesters, polyethers and ethylenically unsaturated compounds as reactive diluents. When used as a coating material, these solutions may contain conventional coating additives, for example leveling agents, pigments, dyes, light stabilizers or, if required, also a crosslinking agent in the case of crosslinked vinyl polymers.

The solids content of the solutions when used as a coating material is preferably from 30 to 95% by weight.

EXAMPLES

Percentages are by weight.

COMPARATIVE EXAMPLES V1 AND V2
(One-stage)

V1

Monomers: 28.0% of methyl methacrylate (MMA); 27.0% of hydroxyethyl acrylate (HEA); 0.5% of acrylic acid (AA); 34.5% of n-butyl acrylate (n-BA); 10.0% of styrene (S)

Initiator: 3.0% of tert-butyl peroctoate (t-BPO); 0.5% of tert-butyl perbenzoate (t-BPB)

Solvent: Butyl acetate

Initially taken: 600.0 g of butyl acetate

| Amount of feed 1: | Amount of feed 2: |
| --- | --- |
| 560.0 of methyl methacrylate | 287.0 g of butyl acetate |
| 540.0 g of hydroxyethyl acrylate | 10.0 g of tert-butyl perbenzoate |
| 10.0 g of acrylic acid | 60.0 g of tert-butyl peroctoate |
| 690.0 g of n-butyl acrylate | |
| 200.0 g of styrene | |

The initially taken substance was heated to 120° C. and was flushed with nitrogen until the beginning of the feed. Feed 1 was then introduced in the course of 150 minutes and feed 2 in the course of 165 minutes at a polymerization temperature of 140° C. Polymerization was then continued for a further 120 minutes.

V2

Monomers: 28.0% of MMA: 27.0% of HEA; 0.5% of AA; 34.5% of n-BA; 10.0% of S

Initiator: 1.5% of di-tert-butyl peroxide (di-tBP); 1.0% of t-BPO

Solvent: Butyl acetate

Initially taken: 800.0 g of butyl acetate

| Amount of feed 1: | Amount of feed 2: | Amount of feed 3: |
| --- | --- | --- |
| 828.0 g of n-butyl acrylate | 200.0 g of butyl acetate | 55.0 g of butyl acetate |
| 648.0 g of hydroxyethyl acrylate | 36.0 g of di-tert-butyl peroxide | 24.0 g of tert-butyl peroctoate |
| 672.0 g of methyl methacrylate | | |
| 12.0 g of acrylic acid | | |
| 240.0 g of styrene | | |

The initially taken substance was heated to 170° C. and feed 1 was introduced in the course of 150 minutes and feed 2 in the course of 210 minutes at a polymerization temperature of 200° C. Thereafter, polymerization was continued for a further 30 minutes, the mixture was then cooled to 120° C. and feed 3 was added in the course of 60 minutes. Polymerization was then continued for a further 60 minutes at 120° C.

COMPARATIVE EXAMPLES V3 TO V5

(Mixtures of the one-stage polymers)

The solutions obtained in Comparative Examples V1 and V2 were mixed as follows:

V3: 300 g of V1 and 700 g of V2
V4: 500 g of V1 and 500 g of V2
V5: 700 g of V1 and 300 g of V2

COMPARATIVE EXAMPLES V6 TO V8

(Two-stage, higher molecular weight in 1st stage) V6 (30% of V1 initially taken)

Total monomers: 34.5% of n-BA; 27.0% of HEA; 28.0% of MMA; 0.5% of AA; 10.0% of S
Initiator: 1.5% of di-tBP; 1.0% of t-BPO
Solvent: Butyl acetate
Initially taken:
860.0 g of V1
350.0 g of butyl acetate

| Amount of feed 1: | Amount of feed 2: | Amount of feed 3: |
| --- | --- | --- |
| 483.0 g of n-butyl acrylate | 200.0 g of butyl acetate | 65.0 g of butyl acetate |
| 378.0 g of hydroxy- | 21.0 g of di-tert- | 14.0 g of tert-butyl |

| Amount of feed 1: | Amount of feed 2: | Amount of feed 3: |
| --- | --- | --- |
| ethyl acrylate | butyl peroxide | peroctoate |
| 392.0 g of methyl methacrylate | | |
| 7.0 g of acrylic acid | | |
| 140.0 g of styrene | | |

The initially taken mixture was heated to 162° C. and feed 1 was introduced in the course of 150 minutes and feed 2 in the course of 210 minutes at a polymerization temperature of 200° C. Thereafter, polymerization was continued for a further 30 minutes, the mixture was cooled to 120° C., feed 3 was added in the course of 60 minutes and polymerization was continued for a further 30 minutes at 120° C.

V7 (50% of V1 initially taken )

Total monomers: 34.5% of n-BA; 27.0% of HEA; 28.0% of MMA; 0.5% of AA; 10.0% of S
Initiator: 1.5% of di-tBP; 1.0% of t-BPO
Solvent: Butyl acetate
Initially taken:
1140.0 g of V1
150.0 g of butyl acetate

| Amount of feed 1: | Amount of feed 2: | Amount of feed 3: |
| --- | --- | --- |
| 276.0 g of n-butyl acrylate | 150.0 g of butyl acetate | 50.0 g of butyl acetate |
| 216.0 g of hydroxyethyl acrylate | 12.0 g of di-tert-butyl peroxide | 8.0 g of tert-butyl peroctoate |
| 224.0 g of methyl methacrylate | | |
| 4.0 g of acrylic acid | | |
| 80.0 g of styrene | | |

The procedure corresponded to V6.

V8 (70% of V1 initially taken)

Total monomers: 34.5% of n-BA; 27.0% of HEA; 28.0% of MMA; 0.5% of AA; 10.0% of S
Initiator: 1.5% of di-tBP; 1.0% of t-BPO
Solvent: Butyl acetate
Initially taken: 1500.0 g of V1

| Amount of feed 1: | Amount of feed 2: | Amount of feed 3: |
| --- | --- | --- |
| 155.3 g of n-butyl acrylate | 150.0 g of butyl acetate | 50.0 g of butyl acetate |
| 121.5 g of hydroxyethyl acrylate | 6.8 g of di-tert-butyl peroxide | 4.5 g of tert-butyl peroctoate |
| 126.0 g of methyl methacrylate | | |
| 2.2 g of acrylic acid | | |
| 450.0 g of styrene | | |

The procedure corresponded to V6.

EXAMPLES B1 TO B3

(Two-stage, higher molecular weight in 2nd stage)

B1 (30% of V2 initially taken)

Total monomers: 28.0% of MMA; 27.0% of HEA; 0.5% of AA; 34.5% of n-BA; 10.0% of S
Initiator: 3.0% of t-BPO; 0.5% of t-BPB
Solvent: Butyl acetate
Initially taken:
600.0 g of V2
200.0 g of butyl acetate

| Amount of feed 1: | Amount of feed 2: |
|---|---|
| 274.4 of methyl methacrylate | 235.0 g of butyl acetate |
| 264.6 g of hydroxyethyl acrylate | 4.9 g of tert-butyl perbenzoate |
| 4.9 g of acrylic acid | 29.4 g of tert-butyl peroctoate |
| 338.1 g of n-butyl acrylate | |
| 98.0 g of styrene | |

The initially taken mixture was heated to 120° C. and feed 1 was introduced in the course of 150 minutes and feed 2 in the course of 165 minutes at a polymerization temperature of 140° C. Polymerization was then continued for 120 minutes at 140° C.

B2 (50% of V2 initially taken)

Total monomers: 28.0% of MMA; 27.0% of HEA; 0.5% of AA; 34.5% of n-BA; 10.0% of S Initiator: 3.0% of t-BPO; 0.5% of t-BPB Solvent: Butyl acetate Initially taken:
1000.0 g of V2
100.0 g of butyl acetate

| Amount of feed 1: | Amount of feed 2: |
|---|---|
| 196.0 of methyl methacrylate | 210.0 g of butyl acetate |
| 189.0 g of hydroxyethyl acrylate | 3.5 g of tert-butyl perbenzoate |
| 3.5 g of acrylic acid | 21.0 g of tert-butyl peroctoate |
| 241.5 g of n-butyl acrylate | |
| 70.0 g of styrene | |

The procedure corresponded to B1.

B3 (70% of V2 initially taken)

Monomers: 28.0% of MMA; 27.0% of HEA; 0.5% of AA; 34.5% of n-BA; 10.0% of S

Initiator: 3.0% of t-BPO; 0.5% of t-BPB

Solvent: Butyl acetate

Initially taken: 1400.0 g of V2

| Amount of feed 1: | Amount of feed 2: |
|---|---|
| 117.6 of methyl methacrylate | 185.0 g of butyl acetate |
| 113.4 g of hydroxyethyl acrylate | 2.1 g of tert-butyl perbenzoate |
| 2.1 g of acrylic acid | 12.6 g of tert-butyl peroctoate |
| 144.9 g of n-butyl acrylate | |
| 42.0 g of styrene | |

The procedure corresponded to B1.

Determination of the average molecular weights $M_n$ and $M_w$ and of the molecular weight distribution:

The weight average molecular weight $M_w$ and the number average molecular weight $M_n$ were determined by gel permeation chromatography (GPC), polystyrene being used as the standard.

The method is described, for example, in Analytiker Taschenbuch, Vol. 4, pages 433 to 442 (Berlin 1984).

Determination of the solid content (SC) and of the pendulum hardness:

Basonat® PLR 8781, a polyisocyanate crosslinking agent from BASF AG, was added to the vinyl polymers containing hydroxyl functional groups and of the Comparative Examples and Examples, in an amount corresponding to an OH/NCO ratio of 1:1, and the application viscosity was brought to 20 s (DIN 53,211 beaker, 4 mm outflow nozzle) with butyl acetate. The solids contents were determined according to DIN V 53,216 1st Part.

Coatings having a wet film thickness of 200 μm were applied to glass sheets using the knife coater. The coats thus obtained were cured for 7 days under standard conditions of temperature humidity. The resulting hardness of the coats was determined by the König pendulum damping measurement (DIN 53,157).

TABLE

Molecular weights of the vinyl polymers and solids content and pendulum hardness of the coating formulations

| Example | Variant | % 1st stage/ % 2nd stage | $M_n$ | $M_w/M_n$ | SC [%] | Pd [s] |
|---|---|---|---|---|---|---|
| V1 | One-stage | — | 7700 | 5.6 | 38.2 | 173 |
| V2 | One-stage | — | 2200 | 2.9 | 53.8 | 48 |
| V3 | Mixture | 30/70 | 2800 | 6.4 | 46.2 | 105 |
| V4 | Mixture | 50/50 | 3400 | 7.1 | 43.4 | 132 |
| V5 | Mixture | 70/30 | 4100 | 7.5 | 40.0 | 158 |
| V6 | Higher molecular weight in 1st stage | 30/70 | 2400 | 8.6 | 45.1 | 93 |
| V7 | Higher molecular weight in 1st stage | 50/50 | 2800 | 10.0 | 42.0 | 101 |
| V8 | Higher molecular weight in 1st stage | 70/30 | 4900 | 14.1 | 38.6 | 119 |
| B1 | Lower molecular weight in 1st stage | 30/70 | 7000 | 8.9 | 37.2 | 183 |
| B2 | Lower molecular weight in 1st stage | 50/50 | 6000 | 8.5 | 39.8 | 173 |
| B3 | Lower molecular weight in 1st stage | 70/30 | 3900 | 3.9 | 46.8 | 159 |

The values in the Table show that both satisfactory solids contents and at the same time satisfactory hardnesses can be obtained with the novel Examples B1 to B3.

We claim:

1. A vinyl polymer obtained by polymerizing vinyl monomers in at least two stages in an organic solvent or in the absence of a solvent, wherein, in the first stage, from 5 to 95% by weight of vinyl monomers are polymerized and, in the second stage, from 5 to 95% by weight of vinyl monomers are polymerized in the presence of the vinyl polymer obtained in the first stage, with the proviso that the polymerization in the second stage is carried out under conditions under which an average molecular weight $M_n$, which is at least 1000 higher compared with that of the vinyl polymer of the 1st stage, results for the vinyl polymer from vinyl monomers of the 2nd stage in the absence of the vinyl polymer obtained in the first stage, and a vinyl polymer is excluded in which the vinyl monomers of the 1st stage consist of 20% by weight of hydroxyethyl methacrylate, 2% by weight of acrylic acid, 41% by weight of styrene and 37% by weight of n-butyl acrylate and those of the 2nd stage consist of 22% by weight of hydroxyethyl acrylate, 76% by weight of ethyl acrylate and 2% by weight of acrylic acid and the limiting viscosity number (measured in chloroform at 20° C.) of the copolymer prepared in the 1st stage is 9.5 ml/g and that of the total vinyl polymer is 13.4 ml/g, wherein the polymerization of the vinyl monomers in the first stage is carried out at from 130° to 250° C. and the polymerization of the vinyl monomers in the second stage is carried out in the presence of the vinyl polymer of the first stage at from 80° to 200° C. and the temperature in the first stage is at least 25° C. higher than in the second stage.

* * * * *